(12) United States Patent
Short et al.

(10) Patent No.: US 8,945,284 B2
(45) Date of Patent: Feb. 3, 2015

(54) DEOILER SEAL

(75) Inventors: Keith E. Short, Rockford, IL (US); Michael R. Blewett, Stillman Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 287 days.

(21) Appl. No.: 13/488,738

(22) Filed: Jun. 5, 2012

(65) Prior Publication Data

US 2013/0319240 A1  Dec. 5, 2013

(51) Int. Cl.
*B01D 45/12* (2006.01)

(52) U.S. Cl.
USPC ............ 95/270; 55/400; 55/408; 55/409; 55/317; 55/418; 55/385.1; 55/385.3; 55/DIG. 19; 55/DIG. 30; 96/188; 96/189; 96/190

(58) Field of Classification Search
USPC ............ 55/317, 418, 385.1, 358.3, 400, 55/404–409, DIG. 19, DIG. 30; 96/188, 96/189, 190; 95/270
See application file for complete search history.

(56) References Cited

U.S. PATENT DOCUMENTS

| | | | |
|---|---|---|---|
| 5,114,446 A | 5/1992 | Giersdorf et al. | |
| 5,716,423 A | 2/1998 | Krul et al. | |
| 6,033,450 A | 3/2000 | Krul et al. | |
| 7,377,110 B2 | 5/2008 | Sheridan et al. | |
| 8,002,864 B2 | 8/2011 | Earith et al. | |
| 8,051,952 B2 | 11/2011 | Bart et al. | |
| 2005/0217272 A1 | 10/2005 | Sheridan et al. | |
| 2011/0120263 A1* | 5/2011 | Short et al. | 74/606 R |

* cited by examiner

*Primary Examiner* — Dung H Bui
(74) *Attorney, Agent, or Firm* — Kinney & Lange, P.A.

(57) ABSTRACT

An assembly includes a housing having a housing cavity, an inlet, and an outlet, a rotatable shaft positioned proximate the outlet, and a seal positioned at an interface of the rotatable shaft and the housing. The seal includes porous material adjacent the shaft and the housing and a shell substantially separating the porous material from the housing cavity. The shell includes an inlet that allows fluid flow from the housing cavity to the porous material and an outlet that allows fluid flow from the porous material to the housing interior. The inlet is positioned radially inward of the outlet.

20 Claims, 3 Drawing Sheets

DEOILER SEAL

BACKGROUND

The present invention relates to gas turbine engines, and in particular to a deoiler for a lubrication system of a gas turbine engine.

Gas turbine engines typically include lubrication systems for providing lubricating liquid, such as oil, to various components of the gas turbine engine such as gears and bearings. Lubrication systems typically supply the oil to the components to cool and lubricate the components and then scavenge used oil from the components, to be cooled, filtered, and supplied again to those components. When the lubricating liquid is scavenged from those components, the lubrication system can scavenge a mixture of oil and air. Particle laden air can be supplied to a deoiler to separate the oil from the air.

In some lubrication systems, a rotating deoiler is positioned in a housing and includes a rotating shaft that interfaces with an outlet of the housing. If the housing is pressurized, oil laden air can undesirably escape between the rotating shaft and the housing. It can be difficult and expensive to adequately seal the interface between the rotating shaft and the housing. Moreover, seals can be wear-prone and can be expensive and time-consuming to replace. Bleed air can be provided to back-pressure the seal to reduce the amount of escaping oil; however providing this air can undesirably reduce engine efficiency.

SUMMARY

According to one embodiment of the present invention, an assembly includes a housing having a housing cavity, an inlet, and an outlet, a rotatable shaft positioned proximate the outlet, and a seal positioned at an interface of the rotatable shaft and the housing. The seal includes porous material adjacent the shaft and the housing and a shell substantially separating the porous material from the housing cavity. The shell includes an inlet that allows fluid flow from the housing cavity to the porous material and an outlet that allows fluid flow from the porous material to the housing interior. The inlet is positioned radially inward of the outlet.

Another embodiment of the present invention is a method for operating an assembly having a shaft is positioned proximate an outlet of a gearbox housing. The method includes rotating the shaft about a centerline axis, sealing an interface between the shaft and the gearbox housing via a seal mounted on the shaft, flowing an air-oil mist through a seal inlet, separating oil from the air-oil mist within the seal, and flowing the oil out of the seal through a seal outlet positioned radially outward of the seal inlet.

DETAILED DESCRIPTION

Figure 1:
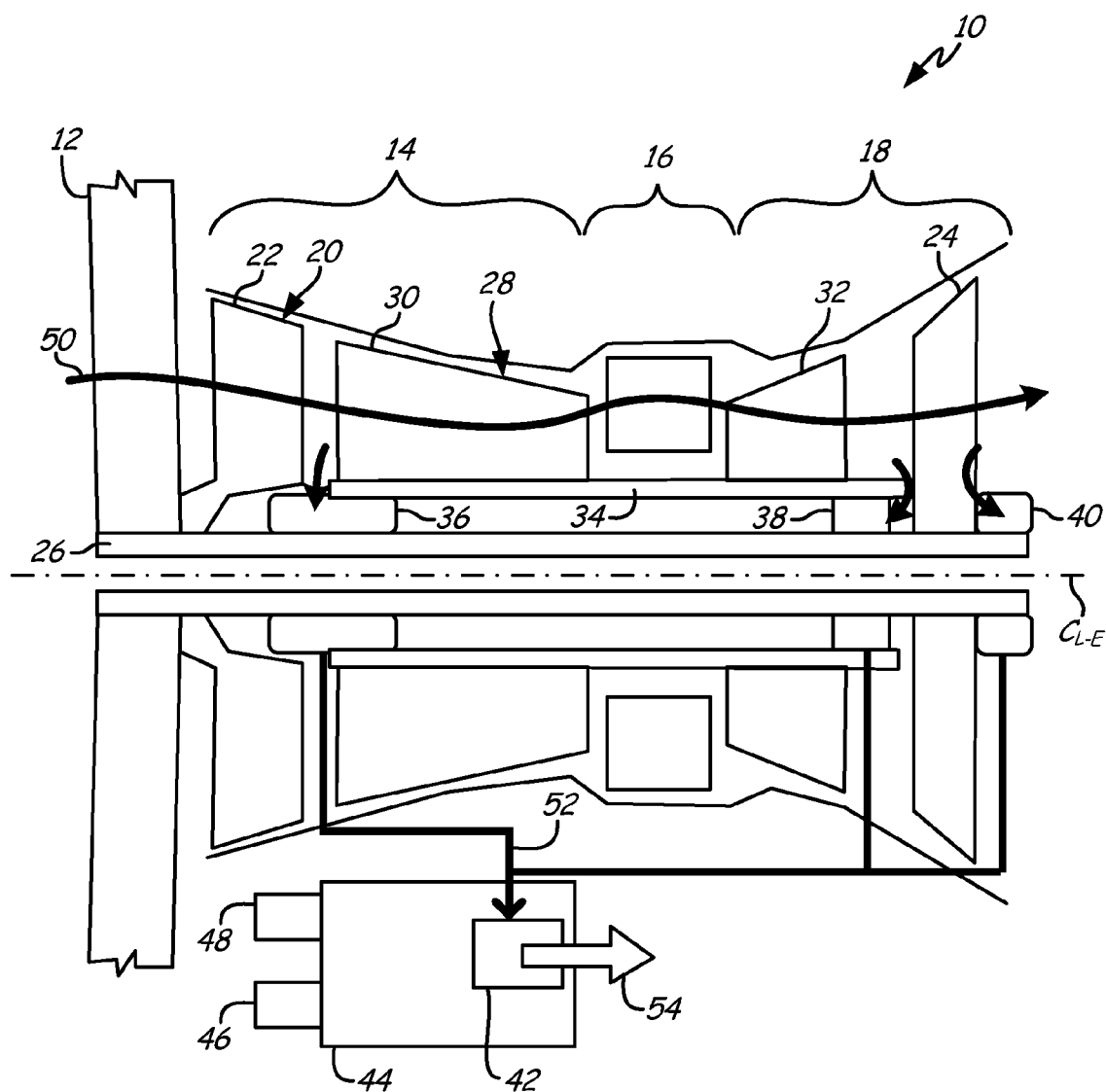
FIG. 1 is a side schematic view of a gas turbine engine.

FIG. 1 is a side schematic view of gas turbine engine 10. Gas turbine engine 10 includes propulsion fan 12, compressor section 14, combustor section 16, and turbine section 18. Low pressure spool 20 (which includes fan 12, low pressure compressor 22, and low pressure turbine 24 connected by low pressure shaft 26) and high pressure spool 28 (which includes high pressure compressor 30 and high pressure turbine 32 connected by high pressure shaft 34) each extend from compressor section 14 to turbine section 18. Low pressure shaft 26 is supported by bearing compartments 36, 38, and 40 which include bearings (not shown). High pressure shaft 34 is supported by bearing compartments 36 and 38. Bearing compartments 36, 38, and 40 allow low pressure shaft 26 and high pressure shaft 34 to rotate at relatively high speeds about engine centerline axis $C_{L-E}$. Gas turbine engine 10 further includes deoiler 42 positioned in gearbox 44. Gearbox 44 can include gearing (not shown) which is connected to one of low pressure spool 20 or high pressure spool 28 for driving various engine accessories mounted to gearbox 44, such as deoiler 42, generator 46, and oil pumps 48.

When gas turbine engine 10 is operated, gas flows from main compressor section 14 to main turbine section 18 along main flow path 50. Gas is compressed in compressor section 14 and then delivered to combustor section 16 where fuel is added and combusted. Gas from combustor section 16 is delivered to turbine section 18, where it drives low pressure turbine 24 and high pressure turbine 32 to rotate low pressure spool 20 and high pressure spool 28, respectively.

Oil pumps 48 can supply a lubricating liquid, such as oil, to various components in gas turbine engine 10, such as gearbox 44 and bearing compartments 36, 38, and 40. Gas flowing along main flow path 50 can be relatively high pressure, which can cause that gas to leak into bearing compartments 36, 38, and 40. Gas in bearing compartments 36, 38, and 40 can be vented along vent passage 52 to deoiler 42. The gas in bearing compartments 36, 38, and 40 can include oil particles when vented to deoiler 42 as an air-oil mist. Deoiler 42 can separate the oil particles from the gas, delivering the separated oil to gearbox 44 and venting the separated gas out of gearbox 44 along flow arrow 54.

Figure 2:
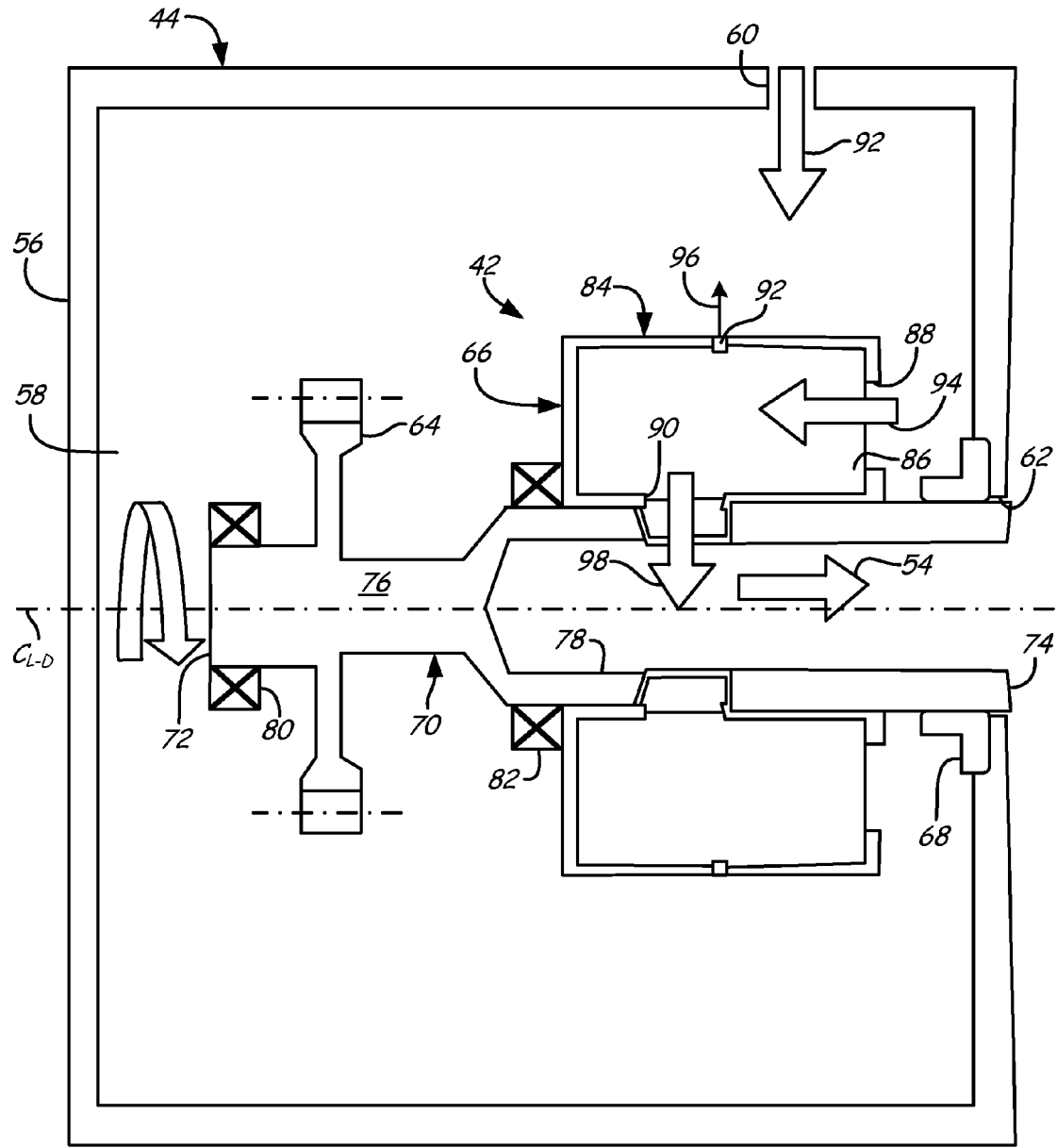
FIG. 2 is a side schematic view a gearbox and deoiler for use in the gas turbine engine of FIG. 1.

FIG. 2 is a side schematic view of gearbox 44 and deoiler 42. Gearbox 44 includes gearbox housing 56 defining housing cavity 58. Gearbox inlet 60 allows flow from vent passage 52 (shown in FIG. 1) into gearbox housing 56 and gearbox outlet 62 allows flow of gas from deoiler 42 out of gearbox housing 56. Deoiler 42 includes gear 64, separator 66, and deoiler seal 68 mounted on deoiler shaft 70. In the illustrated embodiment, deoiler shaft 70 has first end 72 and second end 74. First end 72 is positioned in housing cavity 58 and second end 74 is positioned proximate gearbox outlet 62 of gearbox housing 56. In the illustrated embodiment, second end 74 is positioned slightly exterior of gearbox housing 56. In alternative embodiments, second end 74 can extend further outside of gearbox housing 56, or can be positioned slightly interior of gearbox housing 56. Deoiler shaft 70 has solid shaft portion 76 near first end 72 and hollow shaft portion 78 near second end 74. Deoiler shaft 70 is supported by deoiler bearings 80 and 82. Deoiler bearings 80 and 82 can be ball bearings or another type of bearing suitable for supporting deoiler shaft 70. Deoiler bearing 80 is mounted on solid shaft portion 76 at first end 72. Deoiler bearing 82 is mounted on hollow shaft portion 78 near a middle of deoiler shaft 70. In an alternative embodiment, deoiler bearing 82 can be mounted nearer second end 74.

Gear 64 is mounted to solid shaft portion 76 between bearings 80 and 82, and is driven by gearing (not shown) to rotate deoiler shaft 70. Deoiler seal 68 is mounted on hollow shaft portion 78 near second end 74, proximate gearbox outlet 62 at an interface between deoiler shaft 70 and gearbox outlet 62. Deoiler seal 68 provides a seal between deoiler shaft 70 and gearbox housing 56 at gearbox outlet 62, to allow rotation of deoiler shaft 70 about deoiler centerline axis $C_{L-D}$ while limiting flow of oil through gearbox outlet 62.

Separator 66 is mounted on hollow shaft portion 78, between deoiler bearing 82 and deoiler seal 68. Separator 66 includes separator case 84 and separating media 86 positioned inside separator case 84. Separator case 84 includes separator inlet 88, separator gas outlet 90, and separator oil outlet 92. Separating media 86 can be a porous material, such as a metal foam.

When deoiler 42 is operated, gas and oil flow into gearbox 44 as an air-oil mist through gearbox inlet 60 along flow arrow 92. Housing cavity 58 is pressurized, which pushes the air-oil mist through separator inlet 88 along flow arrow 94 into separating media 86. Oil from the air-oil mist can collect on separating media 86 as the air-oil mist flows through separating media 86. As separator 66 is rotated about deoiler centerline axis $C_{L-D}$, the relatively heavy oil is spun radially outward due to centrifugal force and eventually flows out of separator oil outlet 92 at a radially outward perimeter of separator case 84 along flow arrow 96. At the same time, the relatively light gas (primarily air) flows radially inward through separator gas outlet 90 into hollow shaft portion 78 along flow arrow 98. The gas then flows along flow arrow 54 through gearbox outlet 62, out of deoiler 42 and out of gearbox 44. Thus, deoiler 42 can substantially reduce the amount of oil suspended in the gas flowing through gearbox outlet 62 along flow arrow 54.

Figure 3:
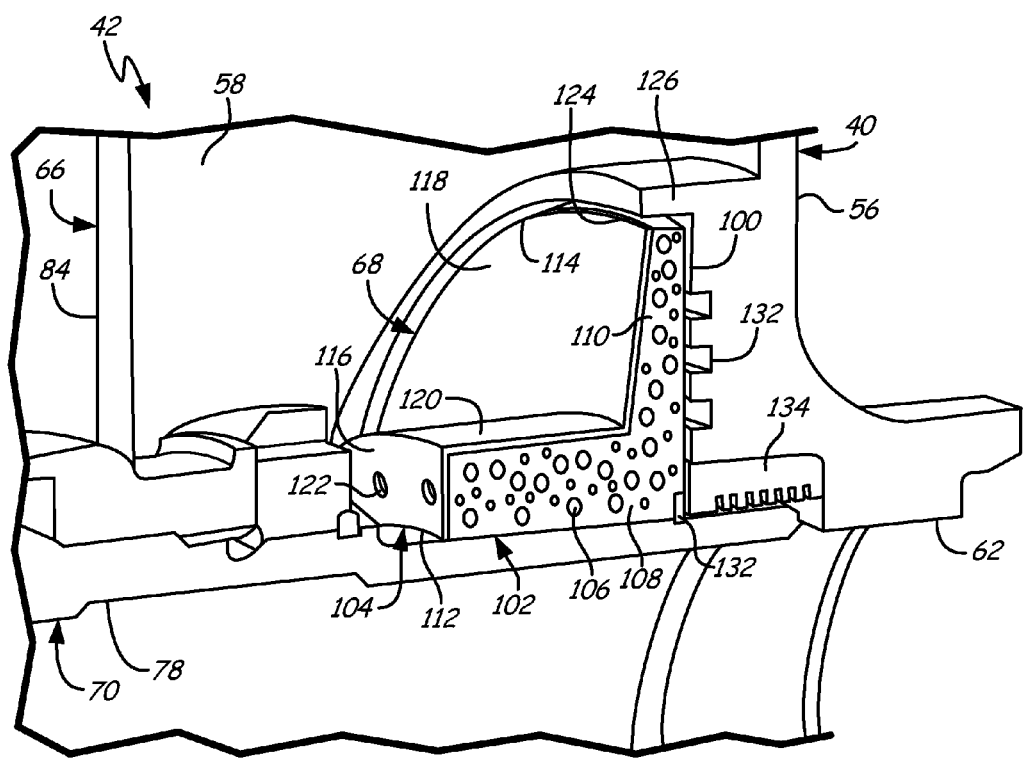
FIG. 3 is a partial perspective sectional view of the gearbox and deoiler of FIG. 2.

FIG. 3 is a partial perspective sectional view of gearbox 44, deoiler 42, and deoiler seal 68. Deoiler seal 68 is positioned on and in contact with deoiler shaft 70, and is spaced from gearbox housing 56 by gap 100. Deoiler seal 68 includes separating media 102 and shell 104.

In the illustrated embodiment, separating media 102 is a porous material having pores 106. Separating media 102 can be metal foam made of, for example, aluminum, nickel alloy, or copper. In an alternative embodiment, separating medial 102 can be a ceramic foam. In further alternative embodiments, separating media 102 can be another media having pores or channels suitable for centrifugally pumping oil droplets radially outward, as described further below. In one embodiment, separating media 102 and separating media 86 (shown in FIG. 2) can be substantially similar materials. In other embodiments, separating media 102 and separating media 86 can be different materials. Separating media 102 is substantially annular, having axial separating portion 108 (which is substantially axially aligned with respect to deoiler centerline axis $C_{L-D}$ shown in FIG. 2) and radial separating portion 110 (which is substantially radially aligned with respect to deoiler centerline axis $C_{L-D}$). Separating media 102 is adjacent and in contact with deoiler shaft 70. Separating media 102 is adjacent and spaced from gearbox housing 56 by gap 100.

Shell 104 is a substantially solid material adjacent separating media 102. Shell 104 can be made of aluminum, steel, or another substantially solid material suitable for the application. Shell 104 substantially separates separating media 102 from housing cavity 58. Separating media 102 substantially fills shell 104. Shell 104 is substantially annular, with radially inner edge 112 adjacent and abutting deoiler shaft 70, and radially outer edge 114 spaced radially outward of radially inner edge 112. Shell 104 has first radial surface 116 extending substantially radially outward from radially inner edge 112, second radial surface 118 extending substantially radially inward from radially outer edge 114, and axial surface 120 extending substantially axially from first radial surface 116 to second radial surface 118.

Shell 104 has seal inlets 122 and seal outlet 124. Shell 104 can substantially seal separating medial 102 from housing cavity 58 except at seal inlets 122 and seal outlet 124. Seal outlet 124 is spaced radially outward of seal inlets 122. In the illustrated embodiment, seal inlets 122 are a plurality of holes extending through first radial surface 116 of shell 104. Seal outlet 124 is defined by a gap between radially outer edge 114 of shell 104 and ridge 126. Ridge 126 is a substantially annular ridge extending from gearbox housing 56. In alternative embodiments, seal inlet 122 and seal outlet 124 can be one or more holes, slots, or gaps shaped and positioned differently than as illustrated. For example, seal outlet 124 can be a plurality of discrete holes extending through shell 104, similar to seal inlets 122. Seal inlets 122 allow fluid flow from housing cavity 58 to separating material 102. Seal outlet 124 allows fluid flow from separating material 102 to housing cavity 58.

Ring 130 is positioned adjacent separating media 102 for holding deoiler seal 68 in place on deoiler shaft 70. Labyrinth seal 132 is positioned adjacent but spaced from separating media 102 to limit flow between gearbox housing 56 and separating media 102. In the illustrated embodiment, labyrinth seal 132 is integrally formed with gearbox housing 56. Labyrinth seal 134 is positioned adjacent but spaced from deoiler shaft 70 to limit flow between gearbox housing 56 and deoiler shaft 56. In one embodiment, labyrinth seal 134 can be made out of aluminum. Because gearbox housing 56 is spaced from both deoiler shaft 70 and deoiler seal 68, a limited amount of gas can flow past deoiler seal 68 and though gearbox outlet 62. Deoiler seal 68 can function to reduce an amount of oil suspended in the gas flowing past deoiler seal 68 and through gearbox outlet 62.

In operation, as deoiler shaft 70 rotates, deoiler seal 68 also rotates. Gas and oil in the form of an air-oil mist can flow through seal inlets 122 into separating media 102. Much like separating media 86 in separator 66, oil from the air-oil mist can collect on separating media 102 as the air-oil mist flows through separating media 102. The separated oil can then be slung radially outward along radial separating portion 110 and out seal outlet 124, and flow back to housing cavity 58. Substantially deoiled air can flow through space between labyrinth seal 134 and deoiler shaft 70, and thus flow through gearbox outlet 62 to an exterior of gearbox housing 56. Deoiler 68 acts as a centrifugal impeller to pump oil droplets radially outward through seal outlet 124. Thus, deoiler seal 68 can function as a seal and also function as a second separator for separating oil from gas. Though the separated gas flowing through space between labyrinth seal 134 and deoiler shaft 70 can still include a substantially reduced quantity of oil particles, gas turbine engine 10 (shown in FIG. 1) can tolerate a limited quantity of oil flowing out gearbox outlet 62 so long as the quantity of oil is below a threshold.

Various embodiments of deoiler seal 68 can provide a relatively cost effective method of sealing an interface between a rotating shaft and a housing, such as deoiler shaft 70 and gearbox housing 56. Deoiler seal 68 can limit flow of oil out gearbox outlet 62 without requiring assistance from a flow of back-pressure air. Because deoiler seal 68 provides a relatively effective seal without contacting gearbox housing 56, deoiler seal 68 can be relatively low-maintenance, capable of lasting the entire lifetime of gas turbine engine 10 without being replaced. This can be particularly beneficial in applications where bearings 80 and 82 allow deoiler shaft 70 to wobble about deoiler centerline axis $C_{L-D}$ at second end 74. Thus, various embodiments of deoiler seal 68 can substantially reduce the cost of operating and maintaining deoiler 42.

While the invention has been described with reference to a exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, deoiler seal 68 can be used to seal an interface of a shaft other than deoiler shaft 70, such as another shaft (not shown) in gearbox 44.

The invention claimed is:

1. An assembly comprising:
   a housing having a housing cavity, an inlet, and an outlet;
   a rotatable shaft positioned proximate the outlet;
   a seal positioned at an interface of the rotatable shaft and the housing, wherein the seal comprises:
      porous material adjacent the shaft and the housing; and
      a shell substantially separating the porous material from the housing cavity, the shell comprising:
         an inlet that allows fluid flow from the housing cavity to the porous material; and
         an outlet that allows fluid flow from the porous material to the housing cavity, wherein the inlet is positioned radially inward of the outlet.

2. The assembly of claim 1, wherein the housing is a gearbox housing, and wherein the rotatable shaft is a deoiler shaft of a deoiler.

3. The assembly of claim 2, wherein the deoiler further comprises:
   a separator mounted on the shaft so as to rotate with the shaft and having separating media positioned inside a separator case.

4. The assembly of claim 3, wherein the separating media and the porous material are substantially similar materials.

5. The assembly of claim 1, wherein the porous material is a metal foam.

6. The assembly of claim 1, wherein the porous material is substantially annular, having a first portion substantially axially aligned with respect to a centerline axis of the shaft and a second portion substantially radially aligned with respect to the centerline axis.

7. The assembly of claim 1, wherein the shell is substantially annular, having a radially inner edge abutting the shaft.

8. The assembly of claim 7, wherein the shell further comprises:
   a first radial surface extending substantially radially outward from the radially inner edge with respect to a centerline axis of the shaft, wherein the inlet is one of a plurality of holes extending through the first radial surface.

9. The assembly of claim 8, wherein the shell further comprises:
   a second radial surface extending substantially radially inward from a radially outer edge of the shell; and
   an axial surface extending substantially axially from the first radial surface to the second radial surface.

10. The assembly of claim 1, and further comprising:
    a first labyrinth seal positioned between the shaft and the outlet of the housing.

11. The assembly of claim 10, and further comprising:
    a second labyrinth seal integrally formed with the housing and positioned adjacent but spaced from the porous material.

12. The assembly of claim 1, wherein the porous material substantially fills the shell.

13. A method for operating an assembly, the method comprising:
    rotating a shaft about a centerline axis, wherein the shaft is positioned proximate an outlet of a gearbox housing;
    sealing an interface between the shaft and the gearbox housing via a seal mounted on the shaft, wherein the seal comprises porous material adjacent the shaft and the gearbox housing, the seal comprises a shell substantially separating the porous material from a housing cavity of the gearbox housing, and the shell comprises an inlet that allows fluid flow from the housing cavity to the porous material and an outlet that allows fluid flow from the porous material to the housing cavity, wherein the inlet is positioned radially inward of the outlet;
    flowing an air-oil mist through the shell inlet;
    separating oil from the air-oil mist within the seal; and
    flowing the oil out of the seal through the shell outlet positioned radially outward of the shell inlet.

14. The method of claim 13, and further comprising:
    rotating a deoiler separator mounted on the shaft;
    flowing an air-oil mist through an inlet of a deoiler separator;
    separating oil from the air-oil mist within the deoiler separator;
    flowing oil out of the deoiler separator through a separator oil outlet into the housing cavity of the gearbox housing; and
    flowing air out of the deoiler separator through a separator gas outlet to an exterior of the gearbox housing.

15. The method of claim 14, wherein oil is separated from the air-oil mist within the seal via a first porous material and wherein oil is separated from the air-oil mist within the deoiler separator via a second porous material.

16. The method of claim 13, wherein the seal is positioned proximate but spaced from the gearbox housing.

17. The method of claim 13, and further comprising:
    limiting flow between the seal and the gearbox housing via a labyrinth seal.

18. The method of claim 13, wherein flowing the air-oil mist through the shell inlet comprises flowing the air-oil mist into the porous material.

19. The method of claim 18, wherein separating oil from the air-oil mist within the seal is performed via the porous material.

20. The method of claim 13, and further comprising:
    flowing substantially deoiled air from the seal through the outlet of the gearbox housing.

* * * * *